United States Patent
Bushman et al.

(10) Patent No.: US 8,781,968 B1
(45) Date of Patent: Jul. 15, 2014

(54) DYNAMIC DISPLAY BASED ON ESTIMATED VIEWERS

(75) Inventors: Serge J. L. Bushman, Overland Park, KS (US); Michael A. Gailloux, Overland Park, KS (US); Don Gunasekara, Reston, VA (US); Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1050 days.

(21) Appl. No.: 12/197,780

(22) Filed: Aug. 25, 2008

(51) Int. Cl.
*G06F 21/00* (2013.01)
*G06Q 30/02* (2012.01)

(52) U.S. Cl.
CPC ........ *G06Q 30/0261* (2013.01); *G06Q 30/0241* (2013.01); *G06Q 30/0251* (2013.01); *G06Q 30/0252* (2013.01)
USPC ........ 705/50; 705/14.4; 705/14.49; 705/14.5; 705/14.63

(58) Field of Classification Search
CPC .......... G06Q 30/0241; G06Q 30/0251; G06Q 30/0252; G06Q 30/300261; G06Q 2220/00
USPC ......... 705/14.4, 14.49, 14.5, 14.58, 14.63, 50
See application file for complete search history.

(56) References Cited

U.S. PATENT DOCUMENTS

| | | | | |
|---|---|---|---|---|
| 5,150,116 A | * | 9/1992 | West | 340/928 |
| 5,214,793 A | * | 5/1993 | Conway et al. | 455/500 |
| 5,510,828 A | * | 4/1996 | Lutterbach et al. | 725/138 |
| 6,004,002 A | * | 12/1999 | Giannone | 362/183 |
| 6,731,940 B1 | * | 5/2004 | Nagendran | 455/456.1 |
| 7,103,368 B2 | * | 9/2006 | Teshima | 455/456.3 |
| 7,440,912 B2 | * | 10/2008 | Asher et al. | 705/26.3 |
| 7,653,569 B1 | * | 1/2010 | Zbib | 707/780 |
| 7,882,653 B2 | * | 2/2011 | Barlow | 40/606.15 |
| 7,903,099 B2 | * | 3/2011 | Baluja | 345/204 |
| 8,138,930 B1 | * | 3/2012 | Heath | 340/601 |
| 8,175,950 B1 | * | 5/2012 | Grebeck et al. | 705/36 R |
| 8,522,270 B2 | * | 8/2013 | Chatter et al. | 725/34 |
| 8,527,338 B2 | * | 9/2013 | Lin | 705/14.4 |
| 8,566,211 B2 | * | 10/2013 | Ausubel et al. | 705/37 |
| 2002/0055880 A1 | * | 5/2002 | Unold et al. | 705/26 |
| 2002/0111146 A1 | * | 8/2002 | Fridman et al. | 455/99 |
| 2003/0001796 A1 | * | 1/2003 | Wampler et al. | 345/2.1 |
| 2003/0004806 A1 | * | 1/2003 | Vaitekunas | 705/14 |
| 2003/0046158 A1 | * | 3/2003 | Kratky | 705/14 |
| 2003/0210806 A1 | * | 11/2003 | Yoichi et al. | 382/104 |
| 2003/0216959 A1 | * | 11/2003 | Vitti | 705/14 |
| 2003/0233275 A1 | * | 12/2003 | Melvin | 705/14 |
| 2004/0036622 A1 | * | 2/2004 | Dukach et al. | 340/691.6 |
| 2004/0183694 A1 | * | 9/2004 | Bauer | 340/907 |
| 2004/0199471 A1 | * | 10/2004 | Hardjono | 705/50 |
| 2005/0084329 A1 | * | 4/2005 | Myers | 404/72 |
| 2005/0150147 A1 | * | 7/2005 | Berryman | 40/590 |
| 2005/0187818 A1 | * | 8/2005 | Zito et al. | 705/14 |
| 2005/0193411 A1 | * | 9/2005 | Funston | 725/36 |
| 2005/0273390 A1 | * | 12/2005 | Hunter | 705/14 |
| 2006/0229939 A1 | * | 10/2006 | Bhakta et al. | 705/14 |
| 2006/0247845 A1 | * | 11/2006 | Cera et al. | 701/117 |

(Continued)

*Primary Examiner* — Calvin Cheung

(57) ABSTRACT

A system is provided for dynamic display based on estimated viewers. The system includes a sensor, a server, and a dynamic display. The sensor senses traffic in an environment. The server estimates a number of potential viewers based on sensing the traffic, selects content based on the number, and communicates the content. The dynamic display receives the content and displays the content for the potential viewers.

13 Claims, 3 Drawing Sheets

(56) References Cited

U.S. PATENT DOCUMENTS

| | | | |
|---|---|---|---|
| 2007/0011050 A1* | 1/2007 | Klopf et al. | 705/14 |
| 2007/0061057 A1* | 3/2007 | Huang et al. | 701/23 |
| 2007/0162342 A1* | 7/2007 | Klopf | 705/14 |
| 2007/0265734 A1* | 11/2007 | Clark | 701/1 |
| 2007/0288350 A1* | 12/2007 | Bykowsky | 705/37 |
| 2008/0004953 A1* | 1/2008 | Ma et al. | 705/14 |
| 2008/0004954 A1* | 1/2008 | Horvitz | 705/14 |
| 2008/0088797 A1* | 4/2008 | Salacuse | 352/104 |
| 2008/0109856 A1* | 5/2008 | Beland | 725/86 |
| 2008/0167943 A1* | 7/2008 | O'Neil et al. | 705/10 |
| 2008/0249853 A1* | 10/2008 | Dekel et al. | 705/14 |
| 2008/0262909 A1* | 10/2008 | Li et al. | 705/14 |
| 2009/0030788 A1* | 1/2009 | Boudah et al. | 705/14 |
| 2009/0076899 A1* | 3/2009 | Gbodimowo | 705/14 |
| 2009/0112691 A1* | 4/2009 | Abrams et al. | 705/10 |
| 2009/0157540 A1* | 6/2009 | Black et al. | 705/37 |
| 2009/0222345 A1* | 9/2009 | Greene | 705/14 |
| 2009/0299857 A1* | 12/2009 | Brubaker | 705/14.66 |
| 2010/0114697 A1* | 5/2010 | Athsani et al. | 705/14.49 |
| 2010/0332316 A1* | 12/2010 | Chaiken et al. | 705/14.46 |
| 2011/0040613 A1* | 2/2011 | Simmons et al. | 705/14.42 |
| 2012/0084171 A1* | 4/2012 | Adair et al. | 705/26.3 |
| 2012/0278145 A1* | 11/2012 | Boudah et al. | 705/14.4 |
| 2013/0066726 A1* | 3/2013 | Umeda | 705/14.71 |
| 2013/0073389 A1* | 3/2013 | Heath | 705/14.54 |
| 2013/0191394 A1* | 7/2013 | Bradley et al. | 707/738 |

* cited by examiner

DYNAMIC DISPLAY BASED ON ESTIMATED VIEWERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A billboard may be a large outdoor advertising structure typically found in high traffic areas, such as alongside busy roads. Billboards present large advertisements to passing pedestrians and drivers. Typically showing large, witty slogans and distinctive visuals, billboards are highly visible in many market areas. Bulletins are the largest, standard-size billboards. Located primarily on major highways, expressways or principal arterials, bulletins command high-density consumer exposure, mostly to vehicular traffic. Bulletins afford greatest visibility due not only to their size, but because they allow creative "customizing" through extensions and embellishments. Posters are another common form of billboard advertising, located chiefly in commercial and industrial areas on primary and secondary arterial roads. Posters are a smaller format than bulletins and are viewed principally by residents and commuter traffic, with some pedestrian exposure. New billboards are being produced that are entirely digital, using light emitting diodes (LED) and similar techniques, allowing static or dynamic advertisements to rotate in succession. Such a dynamic display may be a billboard, a bulletin, or a poster.

SUMMARY

In some embodiments, a system is provided for dynamic display based on estimated viewers. The system includes a sensor, a server, and a dynamic display. The sensor senses traffic in an environment. The server estimates a number of potential viewers based on sensing the traffic, selects content based on the number, and communicates the content. The dynamic display receives the content and displays the content for the potential viewers.

In other embodiments, a method is provided for dynamic display based on estimated viewers. Traffic is sensed in an environment. A number of potential viewers is estimated based on sensing the traffic. A server selects content based on the number. The content is displayed for the potential viewers.

In still other embodiments, a method is provided for dynamic display based on estimated viewers. Traffic associated with an event is sensed. A number of potential viewers is estimated based on sensing the traffic. A server selects content based on the number, the event, and a bid associated with the content. The content is displayed for the potential viewers.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
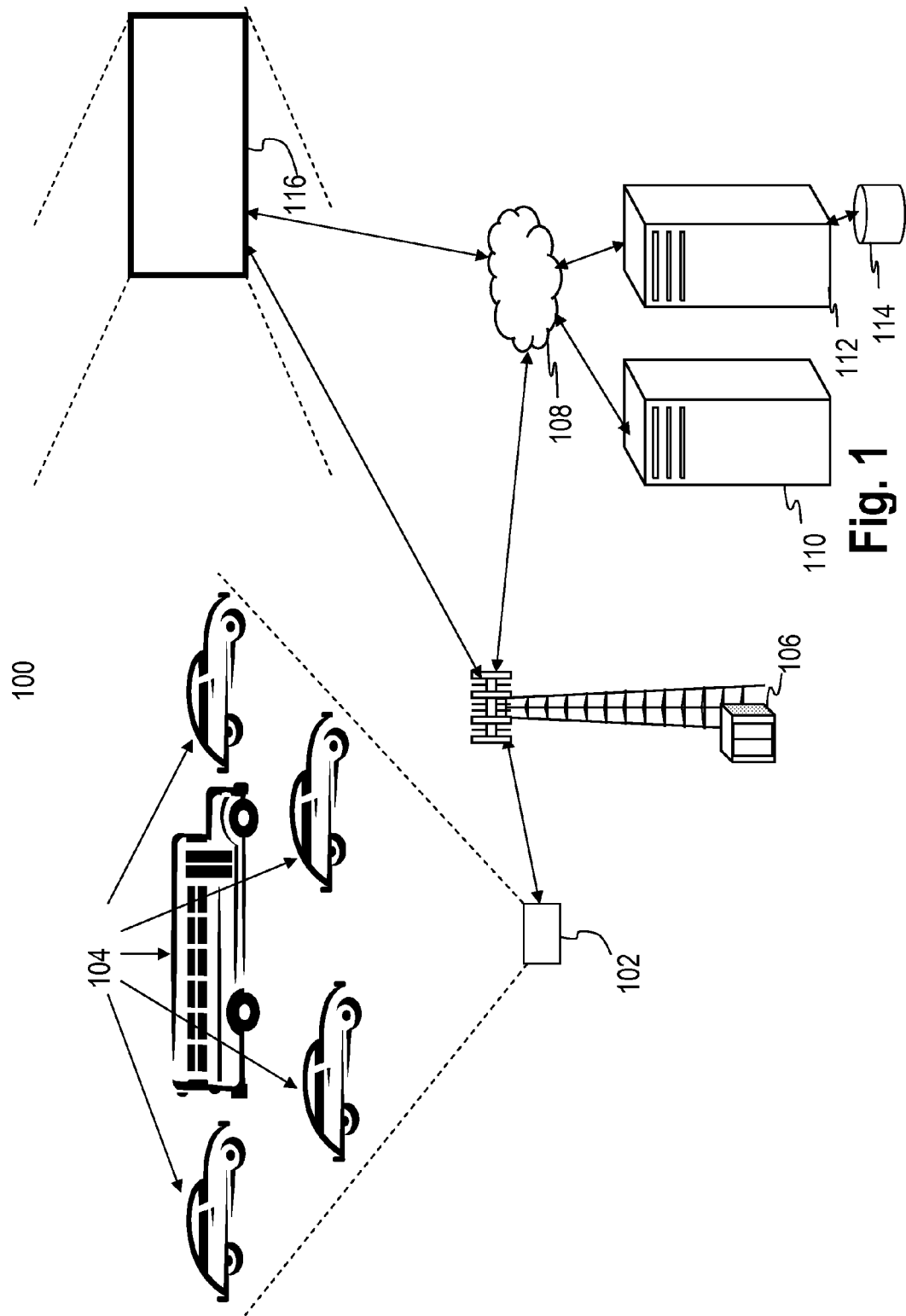
FIG. 1 shows an illustrative wireless communications system for dynamic display based on estimated viewers according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present disclosure select content for dynamic billboards based, at least in part, on estimating the number of potential viewers who will be in a position to see the content on the dynamic billboard. Sensors sense traffic in an environment or at an event, such as cars on a section of highway that leads to a dynamic billboard or cars in the parking lot for a baseball game. A server estimates the number of potential viewers in the traffic based on the sensor's sensing of traffic through the use of various technologies, such as cameras and radio signals. The server selects an advertisement for displaying on the dynamic billboard based on the estimated number of potential viewers. By the time the potential viewers arrive at a position suitable for viewing the dynamic billboard, the advertisement selected for them is being displayed. Selecting the displayed content based on estimated viewers enables advertisers to respond to spontaneous or unanticipated events, such as when a baseball game ends or when a traffic accident occurs.

For example, one advertiser may outbid other advertisers for the advertising rights when more than 100 cars are sensed on the section of highway that leads to the dynamic billboard, which may occur only occasionally during rush hour traffic. In another example, when baseball game advertisement bidding ends with the end of the baseball game, the server determines that an advertiser outbid other advertisers for the advertising rights on a dynamic billboard located in the parking lot of a baseball stadium at the time when the baseball game ends, which is not possible to know in advance. The server may provide the advertisement to the dynamic billboard a few minutes after the server determines that the baseball game ended, or shortly after the sensors indicates traffic moving in the stadium parking lot. If the server determines that when bidding ended an advertiser had submitted a losing bid to display an advertisement on the dynamic billboard in the baseball stadium parking lot, the server may select the same advertisement for displaying a few minutes after traffic begins leaving the parking lot on a dynamic billboard that is located directly outside the stadium parking lot.

The sensors may also estimate the speed of the traffic, such that the server selects advertisements based on the estimated speed of the traffic. For example, the dynamic billboard may display static advertisements for traffic moving at 55 miles per hour and 30 second video advertisements for traffic moving at only 5 miles per hour, which may be due to an accident on the freeway. A personal injury lawyer may bid a premium amount for displaying an advertisement when sensors detect an accident on a freeway. If an advertiser has paid for an advertisement that was displayed when few potential viewers were in the proximity of the dynamic billboard, the server can offer compensation to the advertiser. When the sensor does not sense any traffic, the dynamic billboard may power off to save energy-related expenses. Advertisers may pay more for displaying advertisements when the advertisers can be assured that their advertisements will not be displayed when few or no potential viewers are close enough to view the dynamic billboard. The disclosed system promotes a more optimized use of the dynamic billboard by promoting the display of the appropriate content type and the most valuable information for present conditions.

FIG. 1 shows a wireless communication system 100 that illustrates the context for the present disclosure's systems and methods. The wireless communication system 100 includes a sensor 102 that senses traffic 104 in an environment, such as a highway, or associated with an event, such as a baseball game. The traffic may comprise cars, buses, other motor vehicles, bicycles, skateboards, and pedestrians. The sensor 102 may use a radio signal, a microwave signal, a camera, a radar signal, a laser, a pressure sensor, a magnetic signal, or an optical sensor to sense the traffic 104. The sensor 102 may communicate through a base transceiver station 106 and a wired and/or wireless network 108 to provide information to various servers, such as a communication server 110 and a content server 112. Although FIG. 1 depicts the sensor 102 communicating with the communication server 110 via the base transceiver station 106, the sensor 102 may communicate with the communication server 110 via a wireless link or through a wired link. Additionally, in an embodiment, the sensor 102 may communicate with the communication server 110 via a dynamic display 116 using either wireless or wired links to the dynamic display 116. While one sensor 102 and one base transceiver station 106 are shown in FIG. 1, other sensors 102 and base transceiver stations 106 could be present. Additionally, while the single sensor 102 is shown associated with the dynamic display 116, in other embodiments a plurality of sensors 102 may be associated with the dynamic display 116. Although FIG. 1 depicts one communication server 110 and one content server 112, the functions of the servers 110-112 may be combined in only one server 110 or 112, or distributed across multiple communication servers 110 and content servers 112. The content server 112 may access a database 114 of content or information that may be provided to a dynamic display 116, such as a billboard, bulletin, or poster. The dynamic display 116 may communicate with the communication server 110 and/or the content server 112 via a wireless link or through a wired link, for example via the network 108. The dynamic display 116 may be powered by a solar-charged battery. The content may be an advertisement, a public service announcement, weather information, traffic information, an image, or a video. The dynamic display 116 may comprise a communication transceiver, not shown, for receiving information for displaying. Additionally, in an embodiment, the dynamic display 116 communication transceiver of the dynamic display 116 may serve as a communications relay point between the sensor 102 and the network 108. The dynamic display 116 may promote displaying information using a variety of display mechanisms including arrays of light emitting diodes, projection mechanisms, and other display mechanisms known to those skilled in the art.

Figure 2:
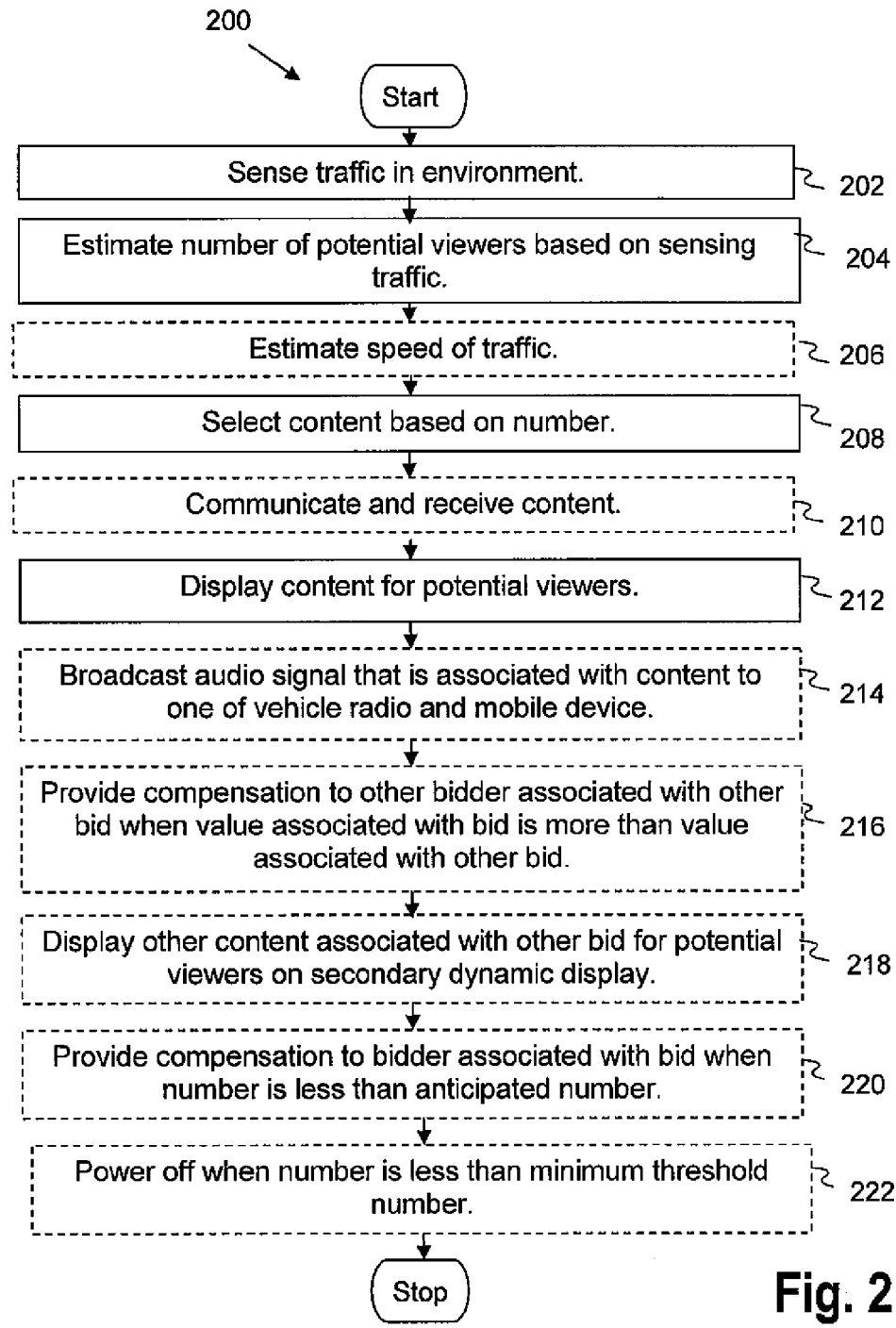
FIG. 2 is a flowchart of a method for dynamic display based on estimated viewers according to some embodiments of the present disclosure.

FIG. 2 shows a flowchart of a method 200 for dynamic display based on estimated viewers according to some embodiments of the present disclosure. The system 100 can execute the method 200 to sense traffic, estimate a number of potential viewers based on the sensed traffic, select content based on the number of potential viewers, and display the content to the potential viewers.

In box 202, traffic is sensed in an environment. For example, the sensor 102 senses four cars and one bus in the traffic 104 on a section of a highway that leads to the dynamic display 116. The sensor 102 may sense the traffic 104 associated with an event, such as cars and buses leaving a parking lot of a baseball stadium.

In box 204, a number of potential viewers is estimated based on sensing the traffic. For example, the communication server 110 estimates 18 potential viewers on the highway section based on sensing the traffic 104. The sensor 102 communicates the signals sensed on the highway via the base transceiver station 106 to the communication server 110, which estimates the potential viewers based on the sensed signals. In this example, the sensor 102 uses a pressure sensor beneath the highway section to estimate that four pairs of short-spaced axles and one pair of long-spaced axles traversed the pressure sensor within a specified time period. The sensor 102 may also use a camera to confirm that the long-spaced axle is a bus, and not a truck, and that the short-spaced axles are cars, and not motorcycles. The communication server 110 may estimate 18 potential viewers based on an estimated 1.5 potential viewers for each of the 4 cars and an estimated 12 potential viewers for the bus. Alternatively, if the sensor 102 uses a high resolution camera, the communication server 110 may use facial recognition to estimate the number of potential viewers in the traffic 104 based on a number of faces counted. The sensor 102 may also use other sensing technologies or other combinations of sensing technologies.

In box 206, a speed of the traffic is optionally estimated. For example, the communication server 110 estimates that the cars and the bus in the traffic 104 are traveling an estimated 55 miles per hour on the highway section that leads to the dynamic display 116. The communication server 110 may estimate speeds based on radar signals, or combinations of the Doppler Effect and radio signals, the time elapsed between detections of axles, or some other sensing means.

In box 208, content is selected based on the estimated number of viewers. For example, the content server 112 selects a hamburger restaurant advertisement for the dynamic display 116 based on the estimated 18 potential viewers in the cars and the bus in the traffic 104. The selection of content may be based on the estimated number of viewers, the event, and a bid associated with the content. For example, the content server 112 selects the hamburger restaurant advertisement based on bids from a hamburger restaurant advertiser and a pizza restaurant advertiser.

In this example, the hamburger restaurant advertiser bid $2 to display the hamburger restaurant advertisement for 5 to 10 potential viewers and bid $8 to display the hamburger restaurant advertisement for 15 to 20 potential viewers. In contrast, the pizza restaurant advertiser bid $3 to display the pizza restaurant advertisement for 5 to 10 potential viewers and bid $7 to display the pizza restaurant advertisement for 15 to 20 potential viewers. For these examples, the content server 112 selects the hamburger restaurant advertisement for the 18 potential viewers based on the bid of $8 from the hamburger restaurant advertiser compared to the bid of $7 from the pizza restaurant advertiser. If the communication server 110 had estimated 8 potential viewers on the highway section, the content server 112 would have selected the pizza restaurant advertisement for the 8 potential viewers based on the bid of $3 from the pizza restaurant advertiser compared to the bid of $2 from the hamburger restaurant advertiser. Although these examples illustrate bids based on some number ranges of potential viewers, advertisers may submit bids based on exact numbers of potential viewers, such as the pizza restaurant advertiser submitting different bids based on each of 11, 12, 13, and 14 potential viewers.

In another example, the content server 112 selects the pizza restaurant advertisement for the 18 potential viewers based on a bid of $9 submitted 2 hours before the end of a baseball game by the pizza restaurant advertiser for 15 to 20 potential viewers leaving the parking lot of the baseball stadium, because the pizza restaurant paid for advertisements displayed on billboard inside the baseball stadium. Selecting content also may be based on an outcome associated with an event. For example, the content server 112 selects the hamburger restaurant advertisement for the 18 potential viewers based on a bid of $10 from the hamburger restaurant advertiser for 15 to 20 potential viewers leaving the parking lot of the baseball game, because the hamburger restaurant advertiser offers free french fries to baseball game ticket stub holders when the home team wins the game. Because bidding can continue until the end of an event, the hamburger restaurant advertiser may increase their bid based on a particularly inspirational home team victory, after which home fans may be even more receptive to advertising associated with the victory. Furthermore, the hamburger restaurant advertiser may offer increased bids for advertisements that honor the home team's player who contributed the most to the victory. Such advertisements may be pre-existing or based on advertisement templates in which a home team player's name and image may be inserted at the end of the game. In contrast, the pizza restaurant advertiser may bid to display pizza restaurant advertisements that offer pizza discounts to cheer up home team fans when the home team loses.

Selecting content may also be based on estimating the speed of the traffic and/or perceived viewing conditions. For example, the content server 112 selects the pizza restaurant advertisement instead of the hamburger restaurant advertisement for 18 potential viewers because the speed of the traffic 104 is estimated at 5 miles per hour on the freeway and the pizza restaurant advertiser bid $8.50 to display a 30 second video advertisement for 15 to 20 potential viewers moving in slow traffic. The potential viewers moving in slow traffic are perceived to have more time than potential viewers moving in fast traffic for viewing the 30 second video advertisement. In contrast, the hamburger restaurant advertiser did not bid an increased amount to display the hamburger restaurant advertisement for 15 to 20 potential viewers moving in slow traffic because the hamburger restaurant advertisement is a static advertisement that does not require a long time to be seen by slow moving traffic. In addition to estimated traffic speed, perceived viewing conditions may also be based on factors such as the weather. For example, potential viewers driving in a rainstorm may more easily view the static advertisement than the 30 second video advertisement due to the need to focus more on driving conditions and the reduced visibility when rain occasionally obscures portions of the 30 second video advertisement. Selecting content also may be based on a type of vehicle sensed. For example, the content server 112 selects an advertisement for an expensive restaurant based on the camera sensing a disproportionately large number of luxury cars in the traffic 104. The content server 112 may identify models and types of cars and trucks based on applying optical recognition software to camera images.

If the communication server 110 determines that the traffic 104 is composed of 5 buses only, the content server 112 may select an advertisement that is displayed on the dynamic display 116 in a manner that is easier to view for viewers on buses rather than viewer in cars. If the communication server 110 determines that the traffic is composed of cars with only drivers as passengers, the content server 112 may select advertisements that target individuals. In contrast, if the communication server 110 determines that the traffic is composed of cars with a disproportionately large number of passengers, the content server 112 may select advertisements that target families.

The bid may be based on the number of potential viewers, the event, a previous bid, and/or an advance premium associated with displaying the content. For example, the pizza restaurant advertiser bid $3 for 5 to 10 potential viewers based on the hamburger restaurant advertiser's previous bid of $2 for 5 to 10 potential viewers. In this example, bidders may increase their bids during a period of time before an event in response to being outbid by other bidders. In another example, the pizza restaurant advertiser ends the bidding process by bidding a "buy now" price of $10 for displaying the pizza restaurant advertisement for 15 to 20 potential viewers at the professional baseball game, which eliminates the possibility that the pizza restaurant advertiser will be outbid for occasions when traffic is leaving the baseball stadium parking lot after the game.

In box 210, the content is communicated and received. For example, the content server 112 communicates the hamburger restaurant advertisement to the dynamic display 116, which receives the hamburger restaurant advertisement.

In box 212, the content is displayed for the potential viewers. For example, the dynamic display 116 displays the hamburger restaurant advertisement for the 18 potential viewers in cars and the bus, who are now estimated to be on the highway section directly in front of the dynamic display 116.

In box 214, an audio signal that is associated with the content is optionally broadcast to a vehicle radio and/or a mobile device. For example, the content server 112 broadcasts a WiMAX audio signal for the hamburger restaurant advertisement to radios and mobile phones in the cars and bus. In this example, the dynamic display 116 may visually specify to which station the radios need to tune to receive the audio signal for the hamburger restaurant advertisement, or the mobile phone may receive the audio signal for the hamburger restaurant advertisement as an incoming call.

In box 216, compensation is optionally provided to another bidder associated with another bid when a value associated with the bid is more than a value associated with the other bid. For example, the content server 112 provides compensation to the hamburger restaurant advertiser when the hamburger restaurant advertiser is outbid by the pizza restaurant advertiser within 2 hours of the baseball game. The pizza restaurant advertiser increased its bid based on learning that 50,000 tickets have been sold for the baseball game, rather than the expected 40,000 tickets. If the pizza restaurant advertiser's bid was 20% higher than the hamburger restaurant advertiser's bid, the content server 112 may offer a 105% refund to the hamburger restaurant advertiser. Other forms of compensation may include reserving occasions for displaying the hamburger restaurant advertisement without requiring payment of the "buy-now" premium.

In box 218, another content associated with the other bid is optionally displayed for the potential viewers on a secondary dynamic display. For example, a secondary dynamic display 116, that is located further from the baseball stadium parking lot, displays the hamburger restaurant advertisement when the hamburger restaurant advertiser is outbid by the pizza restaurant advertiser within 4 hours of the baseball game.

In box 220, compensation is optionally provided to a bidder associated with the bid when the number is less than an anticipated number. For example, the content server 112 provides compensation to the pizza restaurant advertiser for displaying the pizza restaurant advertisement on 4 occasions for 5 to 10 potential viewers when the camera-verified number of 20 potential viewers is less than the anticipated number for the 4 occasions. In this example, 4 occasions of displaying an advertisement for 5 to 10 is expected to result in displaying the advertisement to 30 potential viewers because 4 occasions multiplied by 7.5 potential viewers (the midpoint of the range of 5 to 10 potential viewers) equals 30 potential viewers. Because the dynamic display 116 displayed the pizza restaurant advertisement to significantly fewer potential viewers than anticipated for these 4 occasions, the content server 110 offers compensation to the pizza restaurant advertiser.

In box 222, the dynamic display is optionally powered off when the number is less than a minimum threshold number. For example, the dynamic display 116 powers off when the communication server 110 estimates that no potential viewers are on the section of the highway that is half of a mile in front of the dynamic display 116. The threshold number may be higher than 1 potential viewer if advertisers determine that displaying the content for only 1 potential viewer is not cost effective.

Figure 3:
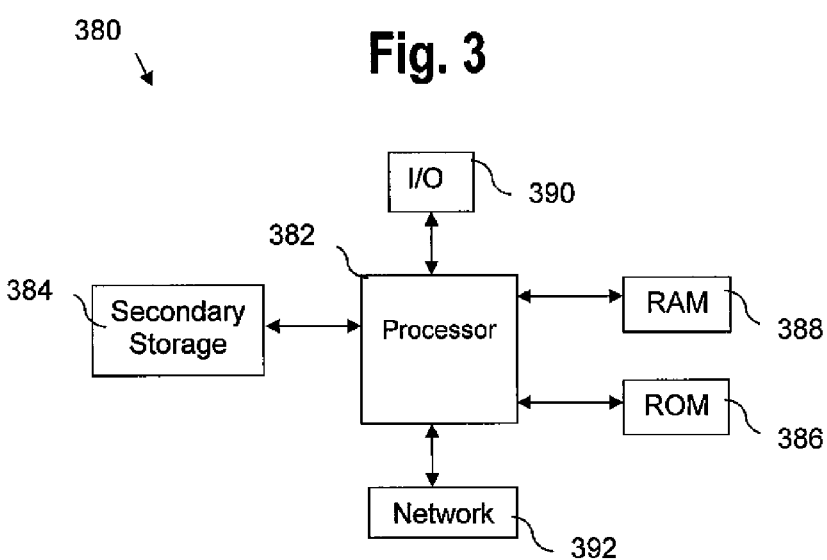
FIG. 3 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 392 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for dynamic display based on estimated viewers, comprising:
   a sensor to sense traffic in an environment;
   a server computer to:
   estimate a number of viewers based on sensing the traffic, select content for display on a dynamic display based on a winning bid of a plurality of bids for the dynamic display placed by a plurality of advertisers, at least one advertiser of the plurality of advertisers places more than one bid of the plurality of bids,
    wherein each bid of the plurality of bids specifies a range defined by a discrete lower limit of a number of viewers greater than zero and a discrete upper limit of a number of viewers, and
    wherein the winning bid is a highest bid of the plurality of bids that is associated with the corresponding range that includes the estimated number of viewers, and
communicate the content; and
the dynamic display to:
    receive the content,
    display the content, and
    power off when the estimated number of viewers is less than a minimum threshold number.

2. The system of claim 1, wherein the sensor uses at least one of a radio signal, a microwave signal, a camera, a radar signal, a laser, a pressure sensor, a magnetic signal, and an optical sensor.

3. The system of claim 1, wherein the content is at least one of an advertisement, a public service announcement, weather information, traffic information, an image, and a video.

4. The system of claim 1, wherein the dynamic display is powered by a solar-charged battery.

5. A computer implemented method for dynamic display based on estimated viewers, comprising:
    sensing traffic in an environment;
    estimating a number of viewers based on sensing the traffic;
    selecting, by a server computer, content for display on a dynamic display based on a winning bid of a plurality of bids for the dynamic display placed by a plurality of advertisers and further based on a type of vehicle sensed, at least one advertiser of the plurality of advertisers places more than one bid of the plurality of bids,
        wherein each bid of the plurality of bids specifies a range defined by a discrete lower limit of a number of viewers greater than zero and a discrete upper limit of a number of viewers, and
        wherein the winning bid is a highest bid of the plurality of bids that is associated with the corresponding range that includes the estimated number of viewers; and
    displaying the content on the dynamic display.

6. The computer implemented method of claim 5, further comprising estimating at least one of a speed of the traffic and perceived viewing conditions.

7. The computer implemented method of claim 5, further comprising broadcasting an audio signal that is associated with the content to one of a vehicle radio and a mobile device.

8. A computer implemented method for dynamic display based on estimated viewers, comprising:
    sensing traffic associated with an event;
    estimating a number of viewers based on sensing the traffic;
    selecting, by a server computer, content for display on a dynamic display based on the event and a winning bid of a plurality of bids for the dynamic display placed by a plurality of advertisers, at least one advertiser of the plurality of advertisers places more than one bid of the plurality of bids,
        wherein each bid of the plurality of bids specifies a range defined by a discrete lower limit of a number of viewers greater than zero and a discrete upper limit of a number of viewers, and
        wherein the winning bid is a highest bid of the plurality of bids that is associated with the corresponding range that includes the estimated number of viewers and the winning bid is based on at least one of a previous bid, the event, or a buy now price associated with displaying the content; and
    displaying the content on the dynamic display.

9. The computer implemented method of claim 8, wherein the event is at least one of an end of a planned event and a traffic event.

10. The computer implemented method of claim 8, wherein selecting content is also based on an outcome associated with the event.

11. The computer implemented method of claim 8, further comprising providing compensation to an advertiser associated with a losing bid of the plurality of bids when a value associated with the winning bid is more than a value associated with the losing bid.

12. The computer implemented method of claim 11, further comprising displaying another content associated with the losing bid on a secondary dynamic display.

13. The computer implemented method of claim 8, further comprising providing compensation to an advertiser associated with the winning bid when the number of viewers is less than the number of estimated viewers.

* * * * *